United States Patent
Ding et al.

(10) Patent No.: US 10,216,323 B2
(45) Date of Patent: Feb. 26, 2019

(54) TOUCH SUBSTRATE, DISPLAY DEVICE AND DRIVING METHOD THEREOF

(71) Applicants: BOE Technology Group Co., Ltd., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Xiaochuan Chen, Beijing (CN); Yingming Liu, Beijing (CN); Shengji Yang, Beijing (CN); Weijie Zhao, Beijing (CN); Wei Liu, Beijing (CN); Changfeng Li, Beijing (CN); Pengpeng Wang, Beijing (CN); Tao Ren, Beijing (CN); Hongjuan Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 137 days.

(21) Appl. No.: 15/519,608

(22) PCT Filed: Oct. 28, 2016

(86) PCT No.: PCT/CN2016/103658
§ 371 (c)(1),
(2) Date: Apr. 17, 2017

(87) PCT Pub. No.: WO2017/071622
PCT Pub. Date: May 4, 2017

(65) Prior Publication Data
US 2017/0262125 A1    Sep. 14, 2017

(30) Foreign Application Priority Data

Oct. 30, 2015  (CN) .......................... 2015 1 0729493

(51) Int. Cl.
*G06F 3/045* (2006.01)
*G06F 3/041* (2006.01)
(Continued)

(52) U.S. Cl.
CPC ........ *G06F 3/0416* (2013.01); *G02F 1/13338* (2013.01); *G02F 1/134309* (2013.01);
(Continued)

(58) Field of Classification Search
CPC .............. G06F 3/0416; G02F 1/13338; G02F 1/134309; G02F 1/136286
(Continued)

(56) References Cited

U.S. PATENT DOCUMENTS 9,442,606 B2    9/2016 Hou
2007/0229464 A1* 10/2007 Hotelling .............. G06F 3/0414
345/173
(Continued)

FOREIGN PATENT DOCUMENTS

CN    102004573 A    4/2011
CN    102968231 A    3/2013
(Continued)

OTHER PUBLICATIONS

International Search Report and Written Opinion for International Application No. PCT/CN2016/103658 dated Jan. 6, 2017.
(Continued)

*Primary Examiner* — Jonathan M Blancha
(74) *Attorney, Agent, or Firm* — Calfee, Halter & Griswold LLP

(57) ABSTRACT

A touch substrate, a display device and a driving method thereof, touch pressure driving electrodes and touch pressure
(Continued)

sensing electrodes provided between the layer where the touch detecting electrodes is located and the substrate carrier are added within the touch substrate, and the touch pressure sensing electrodes and the touch pressure driving electrodes constitute a mutual-capacitance structure. When the touch substrate is pressed, the distance between the touch substrate and the underlying metal layer becomes small, causing that capacitance value of the mutual-capacitance structure becomes small. During the time period for detecting pressure, through applying the touch driving signal to the touch pressure driving electrodes to detect the change of signal amount of the touch pressure sensing electrodes caused by the pressure on the touch position, the change of the capacitance value of the mutual-capacitance structure can be determined to achieve the function of pressure sensing. During the time period for detecting touching, the touch detecting electrodes, the touch pressure driving electrodes, and the touch pressure sensing electrodes are applied with the same touch detecting signal simultaneously, the touch position can be determined by detecting the change of the capacitance value of each of the touch detecting electrodes, and the function of the two-dimensional detection of touching can be realized.

20 Claims, 3 Drawing Sheets

(51) Int. Cl.
G06F 3/044 (2006.01)
G02F 1/1333 (2006.01)
G02F 1/1343 (2006.01)
G02F 1/1362 (2006.01)
G06F 3/047 (2006.01)

(52) U.S. Cl.
CPC ........ *G02F 1/136286* (2013.01); *G06F 3/044* (2013.01); *G06F 3/047* (2013.01); *G02F 2001/13629* (2013.01); *G02F 2201/121* (2013.01); *G06F 2203/04103* (2013.01); *G06F 2203/04105* (2013.01); *G06F 2203/04107* (2013.01)

(58) Field of Classification Search
USPC .......................................................... 345/174
See application file for complete search history.

(56) References Cited

U.S. PATENT DOCUMENTS

| 2012/0062511 A1 | 3/2012 | Ishizaki et al. |
| 2014/0176465 A1 | 6/2014 | Ma et al. |
| 2014/0240281 A1 | 8/2014 | Lee |
| 2015/0035790 A1* | 2/2015 | Mo .......................... G06F 3/044 345/174 |
| 2015/0042613 A1 | 2/2015 | Kim |
| 2017/0068368 A1* | 3/2017 | Hsiao .................... G06F 3/0416 |

FOREIGN PATENT DOCUMENTS

| CN | 202838292 U | 3/2013 |
| CN | 103293785 A | 9/2013 |
| CN | 104007871 A | 8/2014 |
| CN | 205068355 U | 3/2016 |
| EP | 2746840 A1 | 5/2014 |

OTHER PUBLICATIONS

First Office Action for Chinese Patent Application No. 201510729493.7 dated Dec. 5, 2017.

* cited by examiner

TOUCH SUBSTRATE, DISPLAY DEVICE AND DRIVING METHOD THEREOF

CROSS-REFERENCE TO RELATED APPLICATIONS

The present application is based on International Application No. PCT/CN2016/103658, filed on Oct. 28, 2016, which is based upon and claims priority to Chinese Patent Application No. 201510729493.7, filed on Oct. 30, 2015, and the entire contents thereof are incorporated herein by reference.

TECHNICAL FIELD

The present disclosure relates to the technical field of touch display, and more particularly to a touch substrate, a display device and a driving method thereof.

BACKGROUND

External force subjected by an object can be detected by means of pressure sensing technology. This technology has been used in industrial, medical and other fields since long time ago. At present, in a display device, especially on a mobile phone or a tablet, pressure sensing is achieved by the way of adding additional parts in the backlight part of the LCD panel or the frame part of the mobile phone. According to this design, it is necessary to change the structural design of the LCD panel or the mobile phone. Detection accuracy is also limited due to a large assembly tolerance.

Therefore, how to carry out pressure sensing with higher detection accuracy under the condition of making a smaller charge on the hardware, is an urgent problem that those skilled in the art need to resolve.

It should be noted that, information disclosed in the above background portion is provided only for better understanding of the background of the present disclosure, and thus it may contain information that does not form the prior art known by those ordinary skilled in the art.

SUMMARY

The embodiments of the present disclosure provide a touch substrate, a display device and a driving method thereof to achieve a two-dimensional detection of touching.

The embodiments of the present disclosure provide a touch substrate, including a substrate carrier and touch detecting electrodes provided above the substrate carrier, the touch substrate further includes:

touch pressure driving electrodes and touch pressure sensing electrodes provided between a layer where the touch detecting electrodes are located and the substrate carrier, the touch pressure driving electrodes being disposed in a different layer from a layer where the touch pressure sensing electrodes are disposed and each of the touch pressure driving electrodes and a corresponding touch pressure sensing electrode constituting a mutual-capacitance structure;

and a touch detection chip, which is configured to, during a time period for detecting touch, load a touch detecting signal simultaneously on the touch detecting electrodes, the touch pressure driving electrodes and the touch pressure sensing electrodes to detect a change of capacitance value of each of the touch detecting electrodes so as to determine a touch position; during a time period for detecting pressure, load a touch driving signal on the touch pressure driving electrodes to detect a change of a signal amount of each of the touch pressure sensing electrodes caused by a pressure on the touch position.

The embodiments of the present disclosure provide a display device, including the above described touch substrate provided by the embodiments of the present disclosure, and a metal layer provided below the touch substrate.

The embodiments of the present disclosure provide a driving method for the above described display device, including:

during the time period for detecting touch, applying the touch detecting signal to the touch detecting electrodes, the touch pressure driving electrodes, and the touch pressure sensing electrodes simultaneously, detecting a change of capacitance value of each of the touch detecting electrodes to determine a touch position; and during the time period for detecting pressure, applying the touch driving signal to the touch pressure driving electrodes to detect a change of signal amount of the touch pressure sensing electrodes caused by the pressure on the touch position.

DETAILED DESCRIPTION

Figure 1:
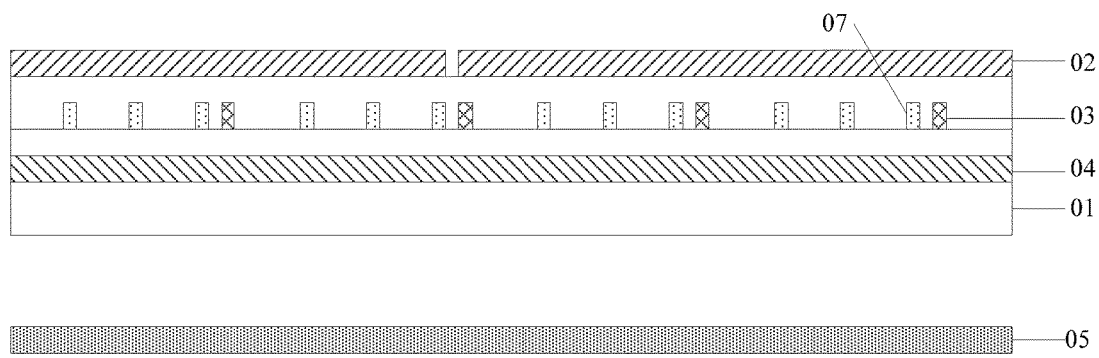
FIG. 1 is a structure diagram of a touch substrate provided by some embodiments of the present disclosure.

Hereinafter, the touch substrate, the display device and the driving method thereof provided by embodiments of the present disclosure will be described further with reference to detailed descriptions.

The thickness and shape of each film shown in the drawings may not be drawn to scale reflect the actual size and are intended to illustratively explain the contents of the present disclosure.

As shown in FIG. 1, a touch substrate provided by some embodiments of the present disclosure includes a substrate carrier 01 and touch detecting electrodes 02 provided above the substrate carrier 01, and further includes the following elements.

Touch pressure driving electrodes 03 and touch pressure sensing electrodes 04 are provided between the layer where the touch detecting electrodes 02 are located and the substrate carrier 01. The touch pressure driving electrodes 03 are disposed in a different layer from a layer where the touch pressure sensing electrodes are disposed. Each of the touch pressure driving electrodes and a corresponding touch pressure sensing electrode constitute a mutual-capacitance structure.

A touch detection chip, which is used for, during the time period for detecting touch, loading a touch detecting signal simultaneously on the touch detecting electrodes 02, the touch pressure driving electrodes 03 and the touch pressure sensing electrodes 04 to detect change of capacitance value of each of the touch detecting electrodes 02 so as to determine a touch position; during the time period for detecting pressure, loading a touch driving signal on the touch pressure driving electrodes 03 to detect the change of signal amount of the touch pressure sensing electrodes 04 caused by a pressure on the touch position.

According to the above described touch substrate provided by the embodiments of the present disclosure, the touch pressure driving electrodes 03 and the touch pressure sensing electrodes 04 provided between the layer where the touch detecting electrodes 02 are located and the substrate carrier 01 are added within the touch substrate. The touch pressure sensing electrodes 04 and the touch pressure driving electrodes 03 constitute a mutual-capacitance structure. When the touch substrate is pressed, the distance between the touch substrate and the underlying metal layer 05 becomes small, that is, the distance between the mutual-capacitance structure and the metal layer 05 becomes small, so that the amount of charge on the mutual-capacitance structure becomes smaller and the capacitance value of the mutual capacitance structure is reduced accordingly. In addition, when the touch driving signal is loaded on the touch pressure driving electrodes 03. The magnitude of induction signal of each of the touch pressure sensing electrodes 04 is related to the frequency of the touch driving signal and the capacitance value of the mutual-capacitance structure. When the frequency of the touch driving signal is definite, the magnitude of the induction signal is positively related to the capacitance value of the mutual-capacitance structure. Since the capacitance value of the mutual-capacitance structure is reduced, the sensing signal of each of the touch pressure sensing electrodes 04 decreases, resulting in a change in the signal amount. Therefore, during the time period for detecting pressure, through applying the touch driving signal to the touch pressure driving electrodes 03 to detect the change of signal amount of each of the touch pressure sensing electrodes 04 caused by the pressure on the touch position, the change of the capacitance value of the mutual-capacitance structure can be determined, so that the pressure in the direction perpendicular to the surface of a touch screen can be detected to achieve the function of pressure sensing. It should be noted that the greater the pressure, the greater the amount of change of capacitance value, and the correspondence between the amount of change of capacitance value and the pressure is stored in advance in a chip. During the time period for detecting touch, as the touch detecting electrodes 02, the touch pressure driving electrodes 03, and the touch pressure sensing electrodes 04 are applied with the same touch detecting signal simultaneously, the touch pressure driving electrodes 03 and the touch pressure sensing electrodes 04 can eliminate the parasitic capacitance of the touch detecting electrodes 02. At this time, the change in the distance between the touch substrate and the underlying metal layer 05 caused by the touch press does not affect the capacitance value of the touch detecting electrodes 02. Therefore, the touch position can be determined by detecting the change in the capacitance value of each of the touch detecting electrodes 02, and the function of the two-dimensional detection of touching can be realized.

Figure 2:
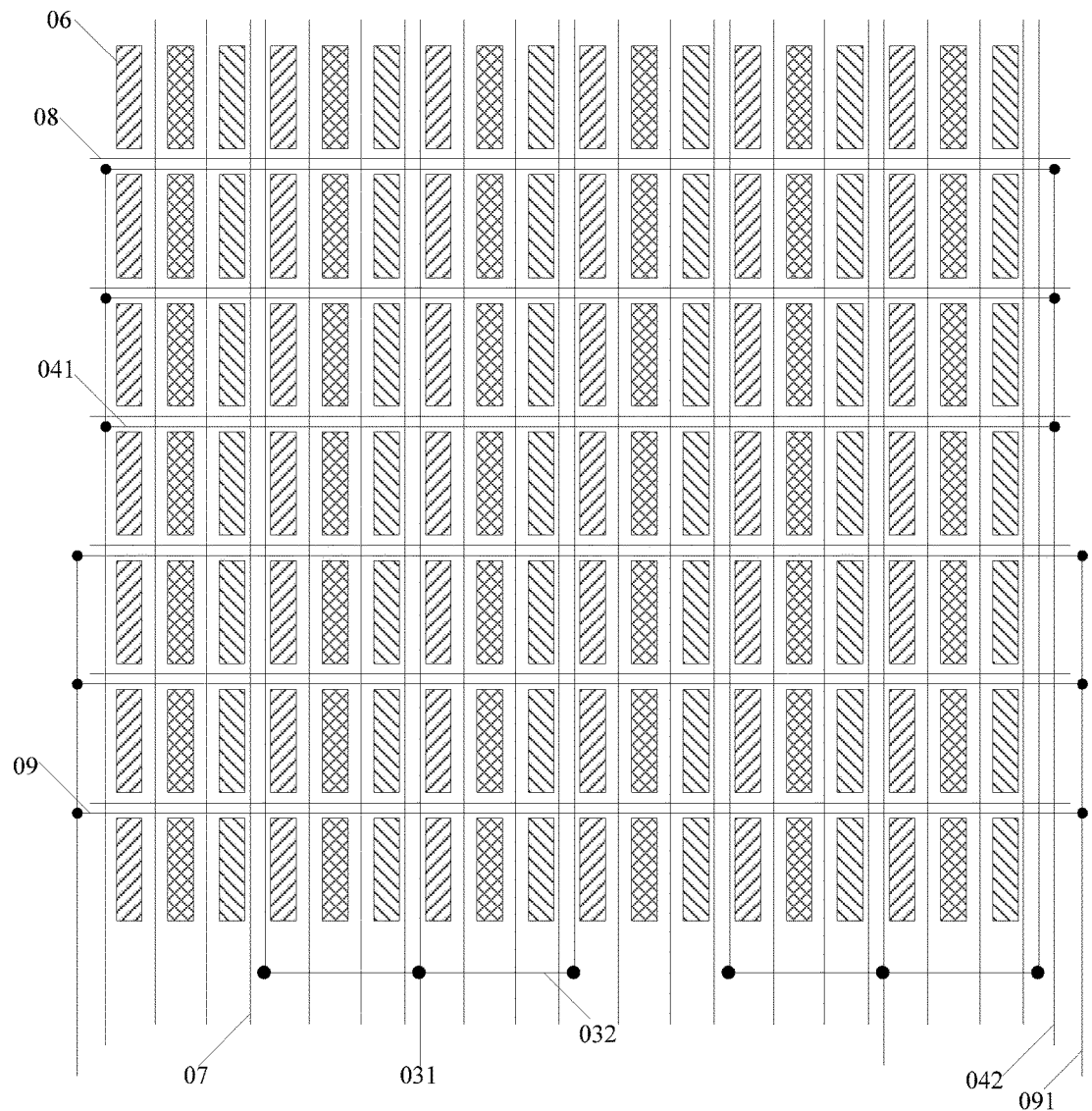
FIG. 2 is a top view of a touch substrate provided by some embodiments of the present disclosure.

In the specific implementation, the above described touch substrate provided by the embodiment of the present disclosure typically uses an array substrate in a touch screen. In order to facilitate the transmission of the signal, the added touch pressure driving electrodes 03 and the touch pressure sensing electrodes 04 are generally made of metal material. Also, in order that the aperture ratio of the display area in the array substrate is not affected by the added touch pressure driving electrodes 03 and the touch pressure sensing electrodes 04 and the cost of the manufacturing process can be saved, in the specific implementation, as shown in FIG. 2, the touch pressure driving electrodes 03 can be composed of at least one driving signal line 031 provided at a gap between columns of pixels 06 in the array substrate and in a same layer as a data line 07. Thus, on the basis of the manufacturing process of the array substrate in the related art, the touch pressure driving electrodes 03 can be formed with the data line 07 at the same time, and it is not necessary to add an additional process to manufacture the touch pressure driving electrodes 03, which can save production cost and increase productivity.

Further, according to the above described touch substrate provided by the embodiment of the present disclosure, in order to facilitate to load the touch driving signal to the driving signal line 031, as shown in FIG. 2, driving signal lines 031 belonging to a same touch pressure driving electrode 03 can be electrically connected to each other through a first wire 032 provided in the same layer as a gate line 08. And, since the first wire 032 is arranged in the same layer as a gate line 08, each of the driving signal lines 031 is arranged in the same layer as the data line 07, and the data line 07 and the gate line 08 are not in the same layer. Therefore, each of the driving signal lines 031 need to be connected to the first wire 32 through a via hole extending through the layer where the driving signal line 031 is located and the layer where the first wire 32 is located.

Similarly, in the specific implementation, as shown in FIG. 2, the touch pressure sensing electrodes 04 can be composed of at least one sensing signal line 041 provided at the gap between columns of pixels 06 in the array substrate and in the same layer as the gate line 08. Thus, on the basis of the manufacturing process of the array substrate in the related art, the touch pressure sensing electrodes 04 can be formed simultaneously with the gate line 08, and it is not necessary to add an additional process to manufacture the touch pressure sensing electrodes 04, which can save production cost and increase productivity.

Further, according to the above described touch substrate provided by the embodiment of the present disclosure, in order to facilitate detecting the change of amount of signal of the sensing signal line 041, as shown in FIG. 2, sensing signal lines 041 belonging to the same touch pressure sensing electrode 04 can be electrically connected to each other through a second wire 042 provided in the same layer as the date line 07. Also, since the second wire 042 is arranged in the same layer as the data line 07, each of the sensing signal lines 041 is arranged in the same layer as the gate line 08, and the data line 07 and the gate line 08 are not in the same layer. Therefore, each of the sensing signal lines 041 needs to be connected to the second wire 42 through a via hole extending through the layer where the sensing signal line 041 is located and the layer where the second wire 42 is located.

Further, as shown in FIG. 2, the above described touch substrate provided by the embodiment of the present disclosure may further include floating electrodes 09 provided at a gap of the column of the pixels 06 other than the gap between columns of the pixels 06 provided with the sensing signal line 041 and in the same layer as the gate line 08. The setting of the floating electrodes 09 can ensure that the electric field of the touch pressure driving electrodes 03 is radiated to the lower side and is affected by the metal layer 05 during the time period for detecting pressure. The floating electrodes 09 are applied with the same touch detecting signal as that applied to the sensing signal line 041 during the time period for detecting pressure, and the floating electrodes 09 are at the state of suspending, that is, being provided no signal.

Similarly, further, according to the above described touch substrate provided by the embodiment of the present disclosure, in order to loading signal on the floating electrodes 09, as shown in FIG. 2, the floating electrodes 09 can be electrically connected to each other through a third wire 091 provided in the same layer as the date line 07. Also, the third wire 091 is arranged in the same layer as the data line 07, each of the floating electrodes 09 is arranged in the same layer as the gate line 08, and the data line 07 and the gate line 08 are not in the same layer. Therefore, each of the floating electrodes 09 needs to be connected to the third wire 091 through a via hole extending through the layer where each of the floating electrodes 09 is located and the layer where the third wire 091 is located.

In the specific implementation, according to the touch substrate provided by the embodiment of the present disclosure, the specific structure of the touch detecting electrodes 02 for touch detection may be implemented in a variety of ways. For example, the touch detecting electrodes 02 may be composed of a plurality of self-capacitance electrodes provided in the same layer and independent to each other, or the touch detecting electrodes 02 can also be composed of a touch driving electrode and a touch sensing electrode which intersect with each other.

Wherein, when the self-capacitance electrode is used to realize the touch detection function, the common electrode layer in the array substrate can be used as the self-capacitance electrode, that is, each of the self-capacitance electrodes constitutes the common electrode layer on the array substrate. When the structure of the common electrode layer is changed and the common electrode layer is divided into each of the self-capacitance electrodes, on the basis of the manufacturing process of the array substrate in the related art, it is not necessary to add an additional process to manufacture the touch detecting electrodes 02, which can save production cost and increase productivity.

Specially, when the above described touch substrate provided by the embodiment of the present disclosure is applied to a display panel, in order to reduce the mutual interference between display and touch, in the specific implementation, the ways of time-sharing driving needs to be used in the stage of touch and in the stage of display. In addition, in the specific implementation, a display driving chip and a touch detection chip can be integrated into one chip, to further reduce production costs Specially, for example, in the driving time sequence diagram shown in FIG. 3, the time of each frame in the display panel is typically divided into a time period of display, a time period for detecting touch, and a time period for detecting pressure.

Figure 3:
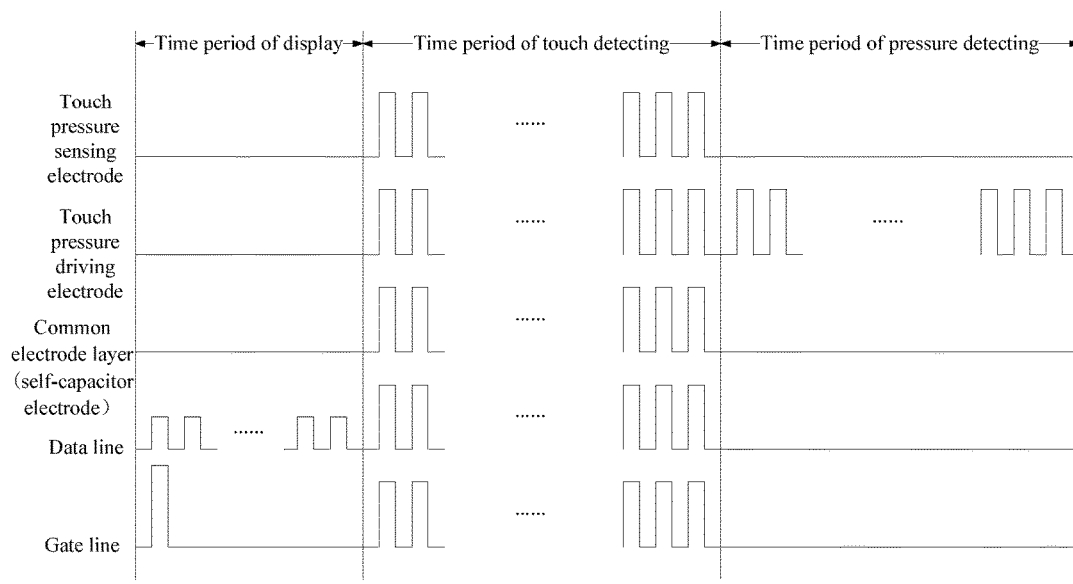
FIG. 3 is a diagram showing driving time sequence of a touch substrate provided by some embodiments of the present disclosure.

During the time period of display, as shown in FIG. 3, a gate scan signal is sequentially applied to each gate signal line in the display panel, and a gray signal is applied to the data signal line. When the common electrode layer is used as the self-capacitance electrode, that is, when the common electrode layer is used as the touch detecting electrodes 02, the touch detection chip connected to each of the self-capacitance electrodes applies a common electrode signal to each of the self-capacitance electrodes respectively to realize the function of a liquid crystal display.

During the time period for detecting touch, as shown in FIG. 3, the touch detection chip simultaneously applies the touch detecting signal to the self-capacitance electrode used as the touch detecting electrodes 02, the touch pressure driving electrodes, and the touch pressure sensing electrodes. The touch pressure driving electrodes and the touch pressure sensing electrodes can eliminate the parasitic capacitance of the self-capacitance electrode used as the touch detecting electrodes 02. At this time, the change in the distance between the touch substrate and the underlying metal layer 05 caused by the touch press does not affect the capacitance value of the self-capacitance electrode. Therefore, the touch position can be determined by detecting the change of the capacitance value of each of the self-capacitance electrodes and the function of the two-dimensional detection of touching can be realized.

Further, as shown in FIG. 3, in order to avoid that during the time period for detecting touch, the accuracy of the touch detection is affected by the ground capacitance occurred between the gate line in the array substrate and the self-capacitance electrode used as the touch detecting electrodes 02, and the ground capacitance occurred between the data line in the array substrate and the self-capacitance electrode used as the touch detecting electrodes 02, in the specific implementation, during the time period for detecting touch, the gate line and the data line in the array substrate can be applied with the same signal as the touch detecting signal. Thus, the ground capacitance occurred between the gate line and the data line in the array substrate and the touch detecting electrodes 02 can be eliminated, and it is facilitate improving the accuracy of touch position detection.

During the time period for detecting pressure, as shown in FIG. 3, the touch detection chip applies a touch driving signal to the touch pressure driving electrodes. At this time, as the touch substrate is pressed, the distance between the touch substrate and the underlying metal layer 05 becomes small, resulting in a corresponding reduction in the capacitance value of the mutual-capacitance structure between the touch pressure driving electrodes and the touch pressure sensing electrodes. Thus, the change of the signal quantity of the touch pressure sensing electrodes caused by the pressure on the touching position is detected to determine the change amount of the capacitance value of the mutual-capacitance structure, so as to detect the pressure in the direction perpendicular to the surface of the touch screen, and the function of pressure sensing can be realized.

It should be noted that the above described touch substrate provided by the embodiments of the present disclosure can be applied to a Liquid Crystal Display (LCD), or an Organic Electroluminescent Display (OLED), or other display panels, and the present disclosure is not limited thereto.

In accordance with the same disclosure concept, the present disclosure also provides a display device including the above-described touch substrate provided by the embodiments of the present disclosure and a metal layer disposed below the touch substrate. The display device may be any product or component having a display function such as a mobile phone, a tablet computer, a television set, a monitor, a notebook computer, a digital photo frame, a navigator, or the like. The embodiment of the display device can refer to the embodiments of the touch substrate described above, and the repetition part will not be described.

Specifically, when the display device provided in the present embodiment is a mobile phone, the metal layer provided below the touch substrate may be a middle frame of the mobile phone, that is, the middle frame in the firmware of the mobile phone is used as the metal layer. When the touch substrate of the above-described display device provide by the embodiments of the present disclosure is provided inside the liquid crystal display panel, the metal layer provided below the touch substrate may be a backlit metal on the back surface of the backlight module, that is, the backlit metal on the back surface of the backlight module serves as a metal layer. In addition, the backlit metal can be embodied as the metal frame covering the outer side of the backlight module, or can be a metal patch affixed to the back surface of the backlight module, and the present disclosure is not limited thereto.

In accordance with the same disclosure concept, the present embodiment of the present disclosure provides a driving method for the above described display device, the method includes the follow steps.

During the time period for detecting touch, the touch detecting signal is applied to the touch detecting electrodes, the touch pressure driving electrodes, and the touch pressure sensing electrodes simultaneously, thus the change of capacitance value of each of the touch detecting electrodes can be detected to determine the touch position.

During the time period for detecting pressure, the touch driving signal is applied to the touch pressure driving electrodes to detect the change of signal amount of the touch pressure sensing electrodes caused by the pressure on the touch position.

Further, the above described driving method also includes: during the time period for detecting touching, the same electrical signals as the touch detecting signals are applied to the gate lines and the data lines.

According to the touch substrate, the display device and the driving method thereof provided by the embodiments of the present disclosure, touch pressure driving electrodes and touch pressure sensing electrodes provided between the layer where the touch detecting electrodes is located and the substrate carrier are added within the touch substrate, and the touch pressure sensing electrodes and the touch pressure driving electrodes constitute a mutual-capacitance structure. When the touch substrate is pressed, the distance between the touch substrate and the underlying metal layer becomes small, resulting that capacitance value of the mutual-capacitance structure is reduced accordingly. Thus, during the time period for detecting pressure, through applying the touch driving signal to the touch pressure driving electrodes to detect the change of signal amount of the touch pressure sensing electrodes caused by the pressure on the touch position, the change of the capacitance value of the mutual-capacitance structure can be determined, so that the pressure in the direction perpendicular to the surface of a touch screen can be detected to achieve the function of pressure sensing. During the time period for detecting touch, as the touch detecting electrodes, the touch pressure driving electrodes, and the touch pressure sensing electrodes are applied with the same touch detecting signal simultaneously, the touch pressure driving electrodes and the touch pressure sensing electrodes can eliminate the parasitic capacitance of the touch detecting electrodes. At this time, the change in the distance between the touch substrate and the underlying metal layer caused by the touch press does not affect the capacitance value of the touch detecting electrodes. Therefore, the touch position can be determined by detecting the change in the capacitance value of each of the touch detecting electrodes, and the function of the two-dimensional detection of touching can be realized.

It will be apparent to those skilled in the art that various changes and modifications can be made in this disclosure without departing from the spirit and scope of the present disclosure. In this way, the present disclosure is intended to embrace such variations and variations if these modifications and variations of this disclosure are within the scope of the present disclosure and the equivalents thereof.

What is claimed is:
1. A touch substrate, comprising
a substrate carrier,
touch detecting electrodes, disposed above the substrate carrier,
touch pressure driving electrodes and touch pressure sensing electrodes, disposed between a layer where the touch detecting electrodes are located and the substrate carrier, the touch pressure driving electrodes being disposed in a different layer from a layer where the touch pressure sensing electrodes are disposed, and each of the touch pressure driving electrodes and a corresponding touch pressure sensing electrode constituting a mutual-capacitance structure; and
a touch detection chip, configured to:
during a time period for detecting touch, load a touch detecting signal simultaneously on the touch detecting electrodes, the touch pressure driving electrodes, and the touch pressure sensing electrodes to detect a change of capacitance value of each of the touch detecting electrodes so as to determine a touch position;
during a time period for detecting pressure, load a touch driving signal on the touch pressure driving electrodes to detect a change of a signal amount of each of the touch pressure sensing electrodes caused by a pressure on the touch position.
2. The touch substrate of claim 1, wherein,
the touch substrate is an array substrate, and each of the touch pressure driving electrodes comprises at least one driving signal line disposed at a gap between columns of pixels in the array substrate and disposed in a same layer as a data line.
3. The touch substrate of claim 2, wherein,
the driving signal lines belonging to a same touch pressure driving electrode are electrically connected to each other through a first wire disposed in a same layer as a gate line.
4. The touch substrate of claim 3, wherein,
each of the driving signal lines belonging to the same touch pressure driving electrode is connected to the first wire through a via hole extending through a layer where the driving signal line is located and a layer where the first wire is located.
5. The touch substrate of claim 2, wherein,
each of the touch detecting electrodes comprises a plurality of self-capacitance electrodes disposed in a same layer and independent to each other.
6. The touch substrate of claim 5, wherein,
each of the self-capacitance electrodes constitutes a common electrode layer on the array substrate.
7. The touch substrate of claim 2, wherein,
each of the touch detecting electrodes comprises a touch driving electrode and a touch sensing electrode which intersect with each other.
8. The touch substrate of claim 2, wherein, during the time period for detecting touch, a same signal as the touch detecting signal is applied to the gate line and the data line in the array substrate.
9. The touch substrate of claim 1, wherein,
the touch substrate is an array substrate, and each of the touch pressure sensing electrodes comprises at least one sensing signal line disposed at a gap between columns of pixels in the array substrate and disposed in a same layer as a gate line.
10. The touch substrate of claim 9, wherein,
the sensing signal lines belonging to a same touch pressure sensing electrode are electrically connected to each other through a second wire disposed in a same layer as a data line.

11. The touch substrate of claim 10, wherein,
each of the sensing signal lines belonging to the same touch pressure sensing electrode is connected to the second wire through a via hole extending through a layer where the sensing signal line is located and a layer where the second wire is located.

12. The touch substrate of claim 9, further comprising floating electrodes, wherein each of the floating electrodes are disposed at a gap between columns of the pixels other than the gap between columns of the pixels disposed with the sensing signal line, and the floating electrodes are disposed in the same layer as the gate line.

13. The touch substrate of claim 12, wherein,
each of the touch detecting electrodes comprises a plurality of self-capacitance electrodes provided in a same layer and independent to each other.

14. The touch substrate of claim 12, wherein,
each of the touch detecting electrodes comprises a touch driving electrode and a touch sensing electrode which intersect with each other.

15. A display device, comprising a touch substrate, and a metal layer provided below the touch substrate, the touch substrate comprises
a substrate carrier,
touch detecting electrodes, disposed above the substrate carrier,
touch pressure driving electrodes and touch pressure sensing electrodes, disposed between a layer where the touch detecting electrodes are located and the substrate carrier, the touch pressure driving electrodes being disposed in a different layer from a layer where the touch pressure sensing electrodes are disposed, and each of the touch pressure driving electrodes and a corresponding touch pressure sensing electrode constituting a mutual-capacitance structure; and
a touch detection chip, configured to:
during a time period for detecting touch, load a touch detecting signal simultaneously on the touch detecting electrodes, the touch pressure driving electrodes, and the touch pressure sensing electrodes to detect a change of capacitance value of each of the touch detecting electrodes so as to determine a touch position;
during a time period for detecting pressure, load a touch driving signal on the touch pressure driving electrodes to detect a change of a signal amount of each of the touch pressure sensing electrodes caused by a pressure on the touch position.

16. The display device of claim 15, wherein,
the touch substrate is an array substrate, and each of the touch pressure driving electrodes comprises at least one driving signal line disposed at a gap between columns of pixels in the array substrate and disposed in a same layer as a data line.

17. The display device of claim 15, wherein, the metal layer is a middle frame of a mobile phone or a backlit metal on a back surface of a backlight module of a liquid display panel.

18. A driving method for the display device of claim 15, comprising:
during the time period for detecting touch, applying the touch detecting signal to the touch detecting electrodes, the touch pressure driving electrodes, and the touch pressure sensing electrodes simultaneously, detecting a change of capacitance value of each of the touch detecting electrodes to determine a touch position; and
during the time period for detecting pressure, applying the touch driving signal to the touch pressure driving electrodes to detect a change of signal amount of each of the touch pressure sensing electrodes caused by the pressure on the touch position.

19. The driving method of claim 18, wherein the metal layer is a middle frame of a mobile phone or a backlit metal on a back surface of a backlight module of a liquid display panel.

20. The driving method of claim 18 further comprising:
during the time period for detecting touch, applying a same signal as the touch detecting signal to the gate line and the data line.

* * * * *